United States Patent [19]
Scott

[11] Patent Number: 5,349,635
[45] Date of Patent: Sep. 20, 1994

[54] HALF-DUPLEX OR FULL-DUPLEX AUTOMODE OPERATION FOR USE IN DATA COMMUNICATIONS EQUIPMENT

[75] Inventor: Robert E. Scott, Indian Rocks Beach, Fla.

[73] Assignee: AT&T Bell Laboratories, Murray Hill, N.J.

[21] Appl. No.: 978,536

[22] Filed: Nov. 19, 1992

[51] Int. Cl.⁵ .................. H04M 11/00; H04B 1/38
[52] U.S. Cl. ............................. 379/97; 379/93; 375/8
[58] Field of Search .............. 379/93, 96, 97, 98, 379/99; 375/8, 121, 9; 370/24, 31

[56] References Cited

U.S. PATENT DOCUMENTS

| | | | |
|---|---|---|---|
| 4,215,243 | 7/1980 | Maxwell | 179/2 DP |
| 4,471,489 | 9/1984 | Konetski et al. | 375/8 |
| 4,599,719 | 7/1986 | Breen et al. | 370/24 |
| 4,680,773 | 7/1987 | Amundson | 375/8 |
| 4,782,498 | 11/1988 | Copeland, III | 375/8 |
| 4,931,250 | 6/1990 | Greszczuk | 375/8 |

OTHER PUBLICATIONS

Advertisement, "Motor Mouth." -Racal-Vadic, The Dial-Up Authority, Network World, Nov. 12, 1990.
Manual pages for Racal-Vadic 9642PA, pp. 2-23, 2-24.
Affidavit by Richard E. McCartney, Largo, Fla.
Annex A to Recommendation V. 32 bis.

Primary Examiner—Curtis Kuntz
Assistant Examiner—Jason Chan
Attorney, Agent, or Firm—Joseph J. Opalach

[57] ABSTRACT

A V.32 compatible modem provides a full-duplex mode of operation, while a 208B compatible modem provides a half-duplex mode of operation. The connect sequence of a V.32 compatible modem is modified so that it will automatically determine if the other modem, whether the originating modem or the answering modem, is a 208B type of modem or a V.32 type of modem. In one embodiment of the invention, the connect sequence of an originating V.32 modem is modified to detect either a 2100 Hz answer tone, which represents that the answering modem is a V.32 type of modem, or a 2021 Hz answer tone, which represents that the answering modem is a 208B type of modem. In another embodiment of the invention, the connect sequence of an answering V.32 modem is modified to transmit first a 2100 Hz answer tone and then, if no 1800 Hz V.32 signal "AA" is received from the originating modem, to transmit a 2021 Hz answer tone, thereby simulating a 208B modem has answered the data call. In either case, once the identity of the other modem is determined, this modified modem will then switch to either a half-duplex mode or a full-duplex mode of operation as appropriate.

13 Claims, 3 Drawing Sheets

HALF-DUPLEX OR FULL-DUPLEX AUTOMODE OPERATION FOR USE IN DATA COMMUNICATIONS EQUIPMENT

BACKGROUND OF THE INVENTION

The present invention relates to modems and to communications networks. In particular, this invention relates to the use of 208B compatible modems and V.32 compatible modems in the same communications network.

Currently, there are a number of communications networks that are built around the 208B type of modem, which transfers data via a half-duplex signaling scheme at a transmission speed of 4800 bits per second (sec.). One example of such a communications network is the Electronic Data Interchange (EDI) network, which may be used by a business to distribute billing and inventory to its various locations. In addition, some states provide a half-duplex communications network to allow insurance carriers to gain access to a state's division of motor vehicles data base to get information on licensed drivers within a state.

However, the 208B type of modem has been around for a long time and in comparison to a state-of-the-art modem, like the V.32 modem, it has a lower data throughput. For example, the V.32 modem can transfer data via a full-duplex signaling scheme and has a transmission speed of 9600 bits per second. Further, the V.32 bis modem is also full-duplex and additionally increases the transmission speed to 14,400 bits per second. Unfortunately, a V.32 type of modem will not connect to a 208B modem. As a result, customer's who have networks comprising 208B modems can only upgrade to a V.32 type of modem by changing out their entire network of modems—at a large cost.

There have been some attempts in the prior art to deal with communications networks comprising different types of modems. One manufacturer sells a modem that can provide either a 208B mode of operation or a V.32 mode of operation. However, the particular mode of operation of this modem is determined by the adjustment of a hardware swap. In other words, the customer must physically access the modem and change a switch setting on the modem. Consequently, this requires that the mode of operation must be determined before even attempting to establish a connection to another modem. Therefore, the customer must know ahead of time the identity of the other modem, i.e., whether it is a 208B type of modem or a V.32 type of modem. While this may be feasible for originating a data call to another modem, this may not be a practical for answering a data call from another modem.

In comparison, U.S. Pat. No. 4,215,243, issued Jul. 29, 1980 to Maxwell discloses a central facility that is capable of receiving data calls that may originate from different types of modems. The central facility, which also comprises a modem pool that includes a number of different types of modems, identifies the calling modem by detecting the frequency of the originating carrier after the central facility has provided an answer tone. Once the calling modem has been identified the central facility connects the calling modem to a respective modem of the same type in its modem pool.

Unfortunately, the approach of the Maxwell reference does not adequately address the problem of switching between a V.32 mode and a 208B mode. In particular, the procedure of the Maxwell reference would have difficulty working in a V.32 modem environment because it occurs too late in the connect sequence, i.e., after the answer tone has been provided, and it provides no way to vary the answertone in the connect sequence. In addition, it also presents a solution that requires a central location with a diverse modem pool, i.e., it relies on the presence of different type of modems in its modem pool to complete the data connection sequence. Finally, it does not address the situation where the central site originates the data call, or where a single modem either originates or answers a data call.

SUMMARY OF THE INVENTION

According to the principles of this invention, the connect sequence of a V.32 compatible modem is modified so that it automatically determines if the other modem is a 208B modem, i.e., half-duplex, or a V.32 modem, i.e., full-duplex. Once the identity of the other modem is determined, this modified modem then switches to either a half-duplex mode or a full-duplex mode of operation as appropriate. As a result, no customer intervention is required to determine the mode of operation of the data connection. Further, this allows a customer who has a communications network of 208B modems to gradually upgrade their communications network one modem at a time.

In any data connection comprising modems over the public switch telephone network (PSTN) there is typically a calling modem, or originating modem, and a called modem, or answering modem. In one embodiment of the invention, the connect sequence of an originating V.32 modem is modified to detect either a 2100 Hz answer tone, which represents that the answering modem is a V.32 type of modem, or a 2021 Hz answer tone, which represents that the answering modem is a 208B type of modem. In another embodiment of the invention, the connect sequence of an answering V.32 modem is modified to transmit first a 2100 Hz answer tone and then, if no 1800 Hz V.32 signal "AA" is received from the originating modem, to transmit a 2021 Hz answer tone, thereby simulating a 208B modem has answered the data call.

In accordance with a feature of the invention, the signal leads between the modified modem and its respective data terminal equipment (DTE) are used to signal the DTE whether the data connection is in full-duplex mode or half-duplex mode.

DETAILED DESCRIPTION

Figure 1:
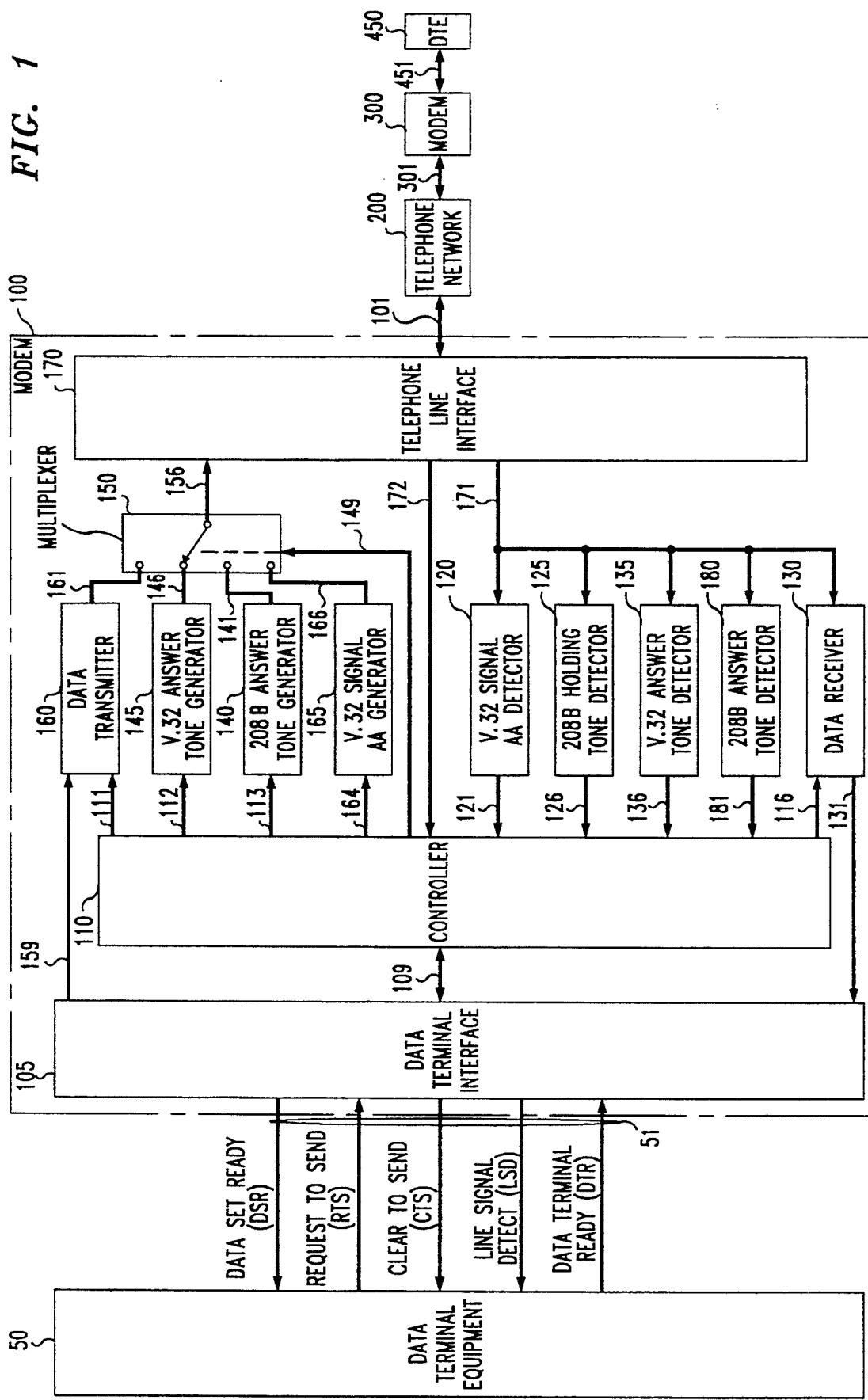
FIG. 1 is a block diagram of a modem embodying the principles of the invention.

FIG. 1 shows a modem that embodies the inventive concept. The individual components of the data communications system are well-known and are not described in detail. In addition, it is assumed that when a signal is referenced in conjunction with either of the terms "V.32" or "208B," that the signal conforms with the respective well-known specification, e.g., International Telegraph and Telephone Consultative Committee (CCITT) V.32, defacto standard Bell System 208B.

As shown, modem 100 is connected to telephone network 200, via telephone line 101. Similarly, modem 300 is connected to telephone network 200 via telephone line 301. The PSTN, or communications channel, is represented by telephone lines 101 and 301, and telephone network 200. Telephone lines 101 and 301 are representative of typical "tip/ring," or local loop, access provided by telephone network 200. Either modem 100 or modem 300 can place a telephone call to another modem by going "off-hook" and following standard dialing procedures.

Modem 100 comprises data transmitter 160, V.32 answer tone generator 145, 208B answer tone generator 140, V.32 signal AA generator 165, multiplexer 150, V.32 answer tone detector 135, 208B answer tone detector 180, 208B holding tone detector 125, V.32 signal AA detector 120, telephone line interface 170, data receiver 130, data terminal interface 105 and controller 110. Both modems 100 and 300 are connected to data terminal equipment DTE 50 and DTE 450 via interfaces 51 and 451, respectively. Both of these interfaces represent a collection of signals as specified in Electronic Industry Association (EIA) standard RS-232, which is a representative standard for interconnecting data terminal equipment to data communications equipment, e.g., DTE 50 to modem 100. A subset of these signals is shown within interface 51. Since this invention relates to the initial phase of establishing the data connection, other circuitry that is required for maintaining a data connection in either V.32 mode or 208B mode has not been shown. For example, during a 208B mode data connection, a holding tone of 600 Hz is typically provided by the answering modem when the data connection is idle.

In the following first example, it is assumed that modem 300 is the originating modem and places a telephone call to modem 100 through telephone network 200. A representative method for processing the incoming telephone call in modem 100 is shown in FIG. 2.

Figure 2:
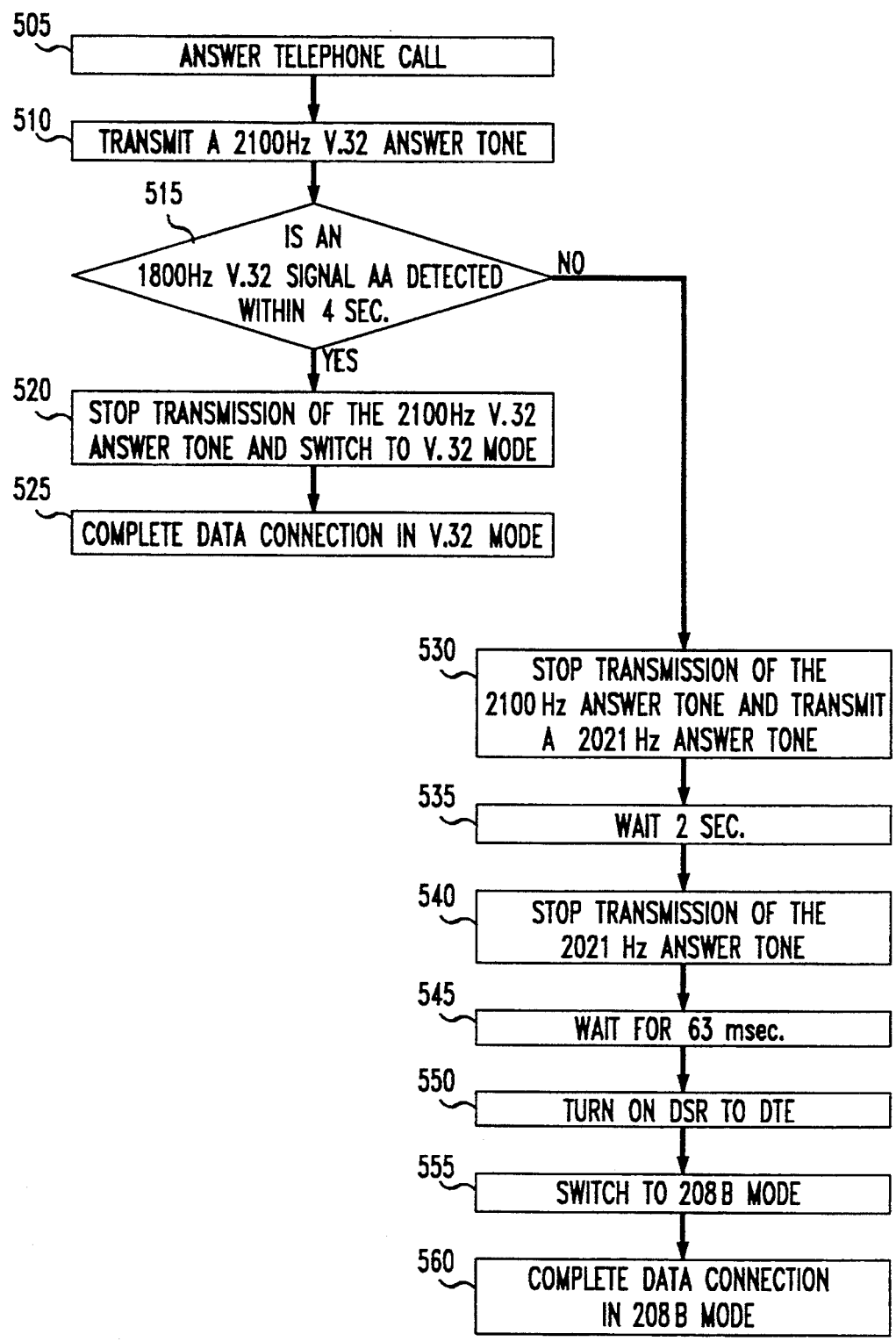
FIG. 2 is a flow diagram of a method embodying the principles of the invention for use in an answering modem.

In step 505, of FIG. 2, telephone line interface 170 of modem 100 answers the telephone call (e.g., by going "off-hook") and provides a signal, which represents that a telephone call has been answered, to controller 110, via lead 172. In step 510, controller 110 provides a signal on lead 112 to turn on V.32 answer tone generator 145, which provides a V.32 answer tone on lead 146. As mentioned above, this V.32 answer tone conforms to CCITT V.32, e.g., it comprises phase reversals and is a 2100 Hz signal, which is applied to multiplexer 150. The latter, under the direction of controller 110 via a signal on lead 149, selects one of its input signals for application to telephone line interface 170. In this case, controller 110 provides a control signal to multiplexer 150 to select the signal from V.32 answer tone generator 145 and provide it to telephone line interface 170. The latter applies the V.32 answer tone to telephone line 101 for transmission to modem 300.

While the V.32 answer tone is being transmitted, controller 110 waits for four seconds for the detection of V.32 signal AA in step 5 15. This signal AA has a frequency of 1800 Hz and is a pan of the V.32 call establishment standard. A waiting period of four seconds is useful to take into account the possibility that the call from the originating modem is being performed manually and that a "late connection" may occur. A late connection is one where the originating modem does not receive at least one second of answer tone. This may happen when a person manually dials a telephone (not shown) that is associated with modem 300 to initiate the data call, and delays in depressing the associated "data call" button. The latter switches the received answer tone from modem 100 to apply it to modem 300.

The incoming signal to modem 100 from modem 300, if any, is received by telephone line interface 170 and applied to V.32 signal AA detector 120. It should be noted that this signal is also applied to 208B holding tone detector 125, V.32 answer tone detector 135 and 208B answer tone detector 180. However, it is not expected that these other detectors will detect their respective signal type when modem 100 is the answering modem. Therefore, for simplicity, these other detectors will be ignored in describing the answering procedure for modem 100. In practice, if a signal is detected by one of these other detectors a respective error condition could be recognized by controller 110 and suitable action taken. Also, since the data connection has not yet been established, controller 110 disables data receiver 130 via a signal on lead 116.

When V.32 signal AA detector 120 detects a signal representative of V.32 signal AA, it signals controller 110 via a signal on lead 121. Controller 110 then turns off V.32 answer tone generator 145, via a signal on lead 112, and switches to V.32 mode in step 520. At this point, controller 110 completes the CCITT V.32 call establishment sequence that includes modem handshaking and training to establish the data connection with modem 300 with the appropriate modulation in step 525.

However, if there is no detection of V.32 signal AA in step 515, then controller 110, after waiting the four seconds, proceeds to step 530. In the latter step, controller 110 turns off V.32 answer tone generator 145, via a signal on lead 112, and turns on 208B answer tone generator 140, via a signal on lead 113. In addition, controller 110 applies a control signal to multiplexer 150, which switches the output signal of multiplexer 150 from the output signal of V.32 answer tone generator 145 to the 208B answer tone provided by 208B answer tone generator 140, via lead 141. This answer tone is then applied to telephone line interface 170 for transmission to modem 300 as described above.

While the 208B answer tone is being transmitted, controller 110 waits for two seconds in step 535. After transmitting a 208B compatible answer tone for 2 seconds, controller 110, in step 540, turns off 208B answer tone generator 140 and applies a control signal to multiplexer 150 so that its selected input signal is now switched back to the output of V.32 answer tone generator 145, which has been turned off in step 530. At this point, multiplexer 150 applies no signal to telephone line interface 170 so that a period of silence for at least 63 milli-seconds (msec.) is created in step 545. During this period of silence the communications channel between modem 100 and modem 300 is idle. After this period of silence, controller 110 turns data set ready (DSR) of interface 51 to the ON state via a signal on lead 109 in step 550. It is assumed that the ON state conforms to the appropriate signal levels in EIA RS-232 representing an active state. The DSR signal indicates to DTE 50 that a data connection is established and that modem 100 is "ready." In step 555, controller 110 enters 208B mode, and, in step 560, completes the data connection to modem 300 in 208B mode. It should be noted that although modem 100 does not formally enter 208B mode until step 555 of FIG. 2, it can be observed from FIG. 2 that modem 100 effectively enters a 208B mode of operation once modem 100 determines in step 515 that there was no detection of V.32 signal AA.

It should be noted that the transmission of an answer tone by modem 100 in step 530 should be continuous. In other words, there should be little, if no, silent period between turning off the V.32 answer tone and turning on the 208B answer tone but rather this should be a smooth transition. This is a result of observing the fact that some existing 208B modems will erroneously detect the 2100 Hz V.32 answer tone as a 208B signal. Consequently, if this situation occurs, the presence of a silent interval will cause the originating 208B to be out-of-sequence in the hand-shaking process to establish the data connection. This may result in either the originating modem beginning to transfer data before the answering modem is ready; or the originating modem may become confused upon subsequent detection of the 208B answer tone and fail to establish the data connection.

Figure 3:
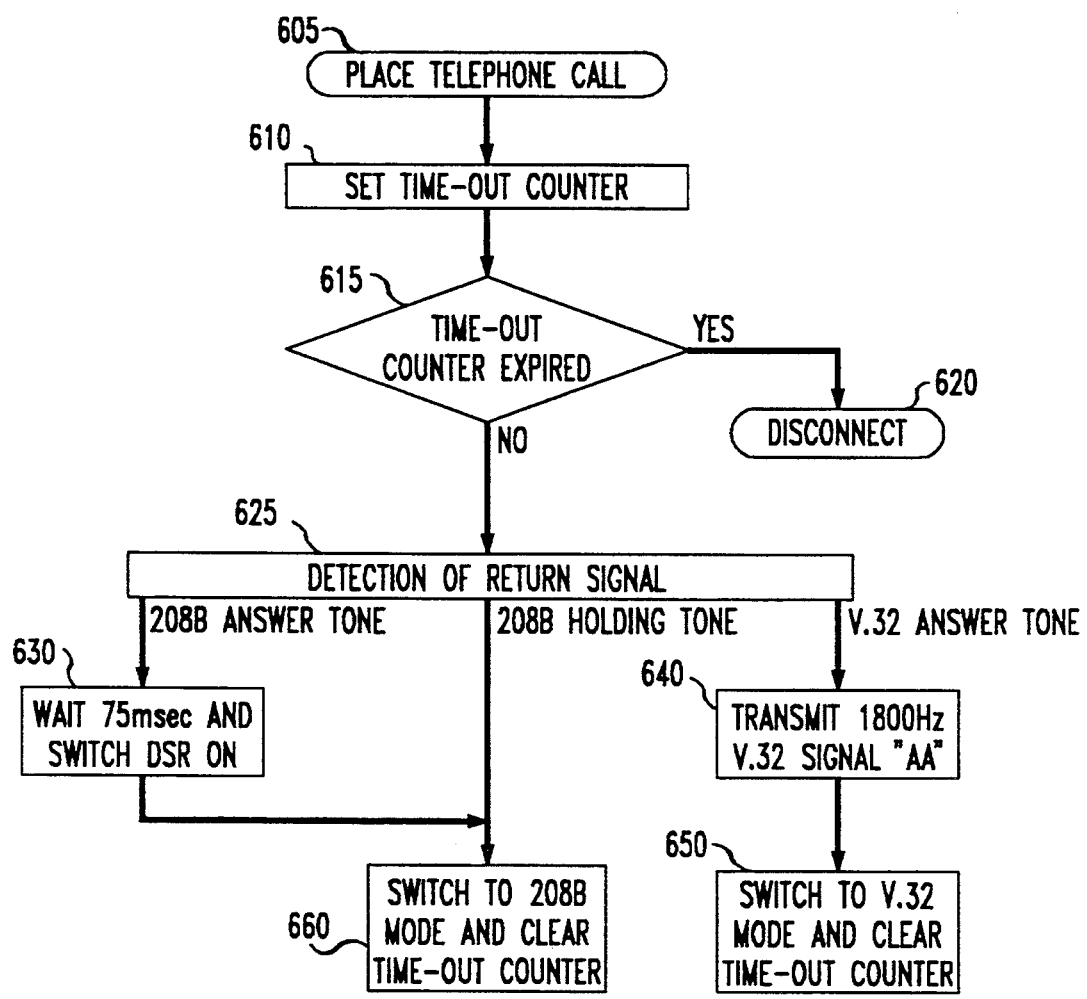
FIG. 3 is a flow diagram of a method embodying the principles of the invention for use in an originating modem.

Turning now to FIG. 3, a representative flow chart is shown for the process that modem 100 follows when it originates a telephone call to modem 300. In step 605, modem 100 places a telephone call to modem 300 as is known in the prior art. After initiating the telephone call, modem 100 sets a time-out counter in step 610. It is assumed this time-out corresponds to an interrupt service routine as is illustrated by step 615. If the time-out counter expires before it is cleared (discussed below), modem 100 disconnects the telephone call in step 620. A typical value for the time-out counter is a number that represents a time delay of 60 seconds. As long as the time-out counter does not expire, modem 100 waits to see which of three possible return signals it may receive from modem 300 in step 625. This return signal is received by telephone line interface 170 and applied in parallel to V.32 signal AA detector 120, 208B holding tone detector 125, V.32 answer tone detector 135 and 208B answer tone detector 180. Since the data connection has not yet been established, controller 110 disables data receiver 130 via a signal on lead 116. It should also be noted that although the return signal is applied to V.32 signal AA detector, it is not expected in the call origination process that the return signal will be a V.32 signal AA. Therefore V.32 signal AA detector 120 will be ignored in the following description of the origination procedure for modem 100. In practice, if a signal is detected by V.32 signal AA detector 120, a respective error condition could be recognized by controller 110.

When a 2021 Hz 208B signal is detected by 208B answer tone detector 180, it signals controller 110 via a signal on lead 181 to go to step 630. Controller 110 then waits for the end of the 2021 Hz 208B signal and for an additional period of 75 msec., and then switches DSR, of interface 51, ON. Then, in step 660, controller 110 enters 208B mode, clears the time-out counter, and completes the data connection as in the prior art.

However, if a 2100 Hz V.32 signal is detected in step 625 by V.32 answer tone detector 135, it signals controller 110 via a signal on lead 136 to go to step 640. In the latter step, controller 110 enables V32 signal AA generator 165 to provide V.32 signal AA to multiplexer 150. The latter, via a control signal on lead 149 from controller 110, provides V.32 signal AA to telephone line interface 170. Upon transmission of the V.32 signal AA, controller 110 enters V.32 mode in step 650, clears the time-out counter and in accordance with V.32 specifications completes the data connection to modem 300.

On the other hand, if in step 625 a 600 Hz 208B holding tone is detected by respective 208B holding tone detector 125, then controller 110 switches to 208B mode in step 660, clears the time-out counter, and completes the data connection to modem 300 in accordance with 208B specifications. A holding tone may be detected if a "late connect" has occurred during a manual dialing procedure as described above.

As described above, in accordance with the principles of the invention, modem 100 in either originating, or answering, a data call automodes between a V.32 compatible mode and a 208B compatible mode of operation. In fact, as noted earlier, this automode operation switches between a full-duplex mode of operation and a half-duplex mode of operation. In particular, the V.32 mode of operation provides a full-duplex signalling scheme at a bit rate of 9600 bits/sec., while the 208B mode provides a half-duplex signalling scheme at 4800 bits per sec. However, there is more to establishing a data connection then just getting the originating modem and the answering modem to pass signals between them. In order to complete the data connection the DTE equipment that is coupled to the data communications equipment, e.g., DTE 50 to modem 100, must be able to support, in some way, the corresponding mode of operation established between the modems. It should be noted that many types of data terminal equipment can function correctly in half-duplex mode while the modem to which it is connected is operating in full duplex mode. However, if DTE 50 only supports a half-duplex mode of operation and modem 100 has switched to a full-duplex mode of operation, modem 100 must simulate half-duplex operation. The ability of a V.32 modem to simulate half-duplex operation over a full-duplex data connection is well-known. This type of configuration can be specified during the administration of modem options by the user. For example, at installation of modem 100, the user configures either through a type of interface, or via hardware straps on the modem itself, that when modem 100 is in V.32 mode it must simulate half-duplex operation.

While even simulated half-duplex operation will provide an increase in data throughput over half-duplex operation, it would be preferable if DTE 50 also supports full-duplex operation. However, if DTE 50 is capable of supporting either full-duplex or half-duplex operation, the user may still have to manually configure DTE 50 to the appropriate setting before even attempting to establish a data connection between modem 100 and modem 300. Therefore, in accordance with a feature of the invention, the EIA RS-232 signal leads are used by the DCE equipment, i.e., modem 100, to signal the DTE equipment whether or not the established data connection is a half-duplex or a full-duplex data connection. This allows a DTE to automatically switch from a half-duplex mode to a full-duplex mode whenever a V.32/V.32 bis connection is made and further increases the user's data throughput. For example, to take advantage of the possible increases in data throughput from a full-duplex data connection modem 100 manipulates EIA RS-232 signals clear to send (CTS) and DSR to allow DTE 50 to detect in which mode modem 100 connected, i.e., half-duplex or full-duplex.

Specifically, as illustrated, the following manipulation of the EIA signal leads is used to signal DTE 50 as to the operating mode of modem 100. In the following, it is assumed that the states of an EIA signal—ON and OFF—conform to the respective voltage levels defined in the above-mentioned standard, EIA RS-232. In addition, it is assumed that signal DSR is switched ON by modem 100 in the process of completing the data connection in either half-duplex mode or full-duplex mode. And, it is also assumed that DTE 50 switches signal request to send (RTS) ON whenever DTE 50 wants to send data to modem 100. If the data connection is in half-duplex mode, modem 100 switches signal CTS ON when DTE 50 switches signal RTS ON as in the prior art. However, in accordance with this feature of the invention, if the data connection is in full-duplex mode, modem 100 switches signal CTS ON simultaneously with signal DSR. The RTS signal from DTE 50 is ignored. DTE 50 can thus determine that modem 100 is in full-duplex mode because signal RTS is OFF yet signal CTS is ON. Finally, modem 100 can also signal a simulated half duplex mode when DTE 50 switches signal RTS ON. This is accomplished by modem 100 thereafter switching line signal detect (LSD) OFF and switching signal CTS ON within 2 msec.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, even though the invention has been illustrated herein as being implemented with discrete functional building blocks, e.g., tone generators, tone detectors, etc., the functions of any one or more of these building blocks can be carried out using one or more appropriate programmed processors.

In addition, even though the invention has been illustrated herein as being implemented by use of a V.32 modem, other modem types, like the V.32 bis modem, could also be similarly modified in accordance with the principles of the invention. Also, while the 208B is typically used in a synchronous communications environment, the inventive technique can also be applied to an asynchronous communications environment.

Finally, it should be realized that although the inventive concept discussed above used the term "answer tone," i.e., a single frequency signal, in reality the above-mentioned standards may define an answer tone as a narrow frequency band that is centered about, or includes, the above-mentioned frequencies. For example a modem may generate a tone at 2099 Hz that is an acceptable V.32 answer tone even though a V.32 answer tone was described above as 2100 Hz.

I claim:

1. A method for originating a data call for use in data communications equipment, the method comprising the steps of:
   a) placing a telephone call to a called party;
   b) detecting an answer tone from an answering data communications equipment of the called party, where the answer tone comprises a single frequency; and
   c) switching to one of a number of operating modes as a function of the frequency of the detected answer tone;
   where the one of the number of operating modes is a full-duplex mode and another one of the number of operating modes is a half-duplex mode, and where said full-duplex operating mode is selected if the frequency of the detected answer tone is at a first frequency and where the half-duplex operating mode is selected if the frequency of the detected answer tone is at a second frequency, where the first frequency and the second frequency are different from each other.

2. The method of claim 1 wherein the full-duplex mode is a V.32 mode of operation and the first frequency is 2100 Hz, and the half-duplex mode is a 208B mode of operation and the second frequency is 2021 Hz.

3. A method for originating a data call for use in data communications equipment, the method comprising the steps of:
   a) placing a telephone called to a called party;
   b) detecting an answer tone from an answering data communications equipment of the called pray, where the answer tone comprises a single frequency; and
   c) switching to one of a number of operating modes as a function of the frequency of the detected answer tone;
   where the one of the number of operating modes is a full-duplex mode and another one of the number of operating modes is a half-duplex mode, and where said full-duplex operating mode is selected if the frequency of the detected answer tone is within a first narrow frequency band and where the half-duplex operating mode is selected if the frequency of the detected answer tone is within a second narrow frequency band, where the first narrow frequency band and the second narrow frequency band are different from each other.

4. The method of claim 3 wherein the full-duplex mode is a V.32 mode of operation and the first narrow frequency band includes 2100 Hz, and the half-duplex mode is a 208B mode of operation and the second narrow frequency band includes 2021 Hz.

5. A method for answering a data call for use in data communications equipment, the method comprising the steps of:
   a) answering a data call from a calling party;
   b) providing a first signal comprising a single frequency to a communications channel for transmission to the calling party, the first signal having a duration of $T_1$ seconds;
   c) providing a second signal comprising a single frequency to the communications channel for transmission to the calling party, the second signal having a duration of $T_2$ seconds, where the time duration of $T_2$ occurs subsequent to the time duration of $T_1$;
   d) waiting for a period of time, $T_3$ seconds, where the time duration of $T_3$ occurs subsequent to the time duration of $T_2$; and
   e) following step d, switching to a half-duplex mode of operation for controlling the transmitting and receiving of information to and from the calling party over the communications channel.

6. The method of claim 5 where the time interval $T_3$ is at least 63 milli-seconds.

7. The method of claim 6 wherein the first signal is a V.32 answer tone having a single frequency of 2100 Hz and the second signal is a 208B answer tone having a signal frequency of 2021 Hz, and the half-duplex mode of operation is a 208B mode of operation.

8. Apparatus for use in data communications equipment comprising:
   means responsive to a ringing signal from a communications channel for answering a telephone call from an originating modem and for providing a first signal which represents that the telephone call has been received; and means responsive to the first signal for a) generating a sequence of tones for transmission to the originating modem over the communications channel, where the first tone of the sequence is at a first frequency with a duration of $T_1$ seconds, where the second tone of the sequence is at a second frequency with a duration of $T_2$ seconds followed by a silent period of $T_3$ seconds, and for b) switching to a half-duplex mode of operation after said $T_3$ time interval.

9. The apparatus of claim 8 wherein the time interval $T_3$ is at least 63 milli-seconds.

10. The apparatus of claim 11 wherein the first tone is a V.32 answer tone with a frequency of 2100 Hz, the second tone is a 208B answer tone with a frequency of 2021 Hz, and the half-duplex mode of operation is a 208B mode of operation.

11. Apparatus for use in data communications equipment comprising:

means for receiving an answer tone signal from a communications channel, the answer tone signal comprising a single frequency; and means for determining whether the received answer tone signal comprises a first predetermined frequency or a second predetermined frequency and for providing a determination signal; and means responsive to the determination signal for switching between a full-duplex mode of operation and a half-duplex mode of operation.

12. The apparatus of claim 11 wherein the predetermined first frequency is 2100 Hz, the predetermined second frequency is 2021 Hz, the full-duplex mode is a V.32 compatible mode, and the half-duplex mode is a 208B compatible mode.

13. Data communications equipment apparatus comprising:

means for receiving an answer tone from a communications channel from an answering modem;

multi-modulation means for providing one of two modulation schemes, where one of said modulation schemes has a transmission rate of 4800 bits/second and is half-duplex and the other modulation scheme has a transmission rate of at least 9600 bits/second and is full-duplex; and means for selecting one of the two modulation schemes as a function of the received answer tone, where the 4800 bits/second half-duplex modulation scheme is selected if the received answer tone has a frequency of 2021 Hz and where the at least 9600 bits/second full-duplex modulation scheme is selected if the received answer tone has a frequency of 2100 Hz.

* * * * *